Figure 1:
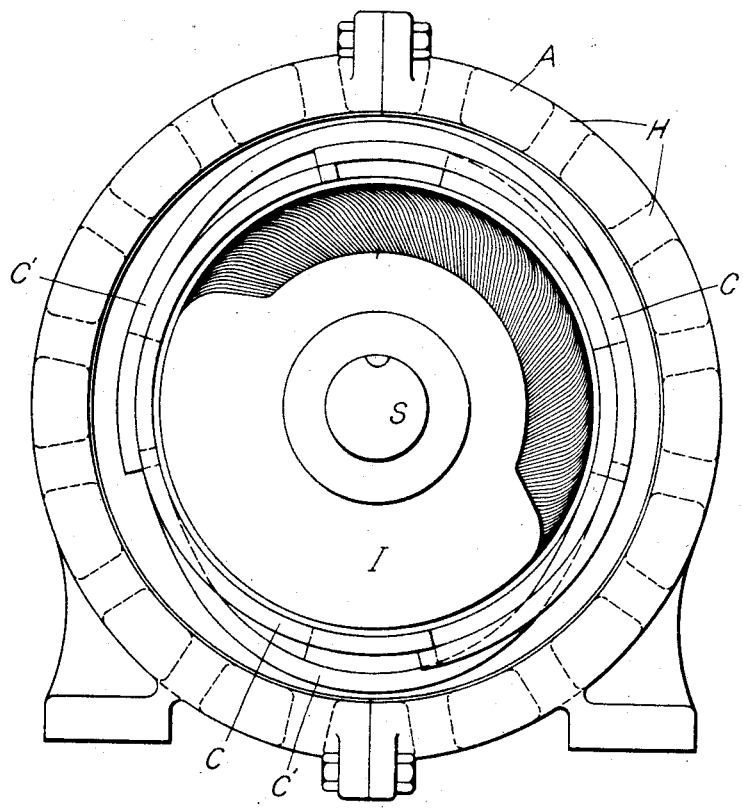

No. 831,475. PATENTED SEPT. 18, 1906.
D. B. RUSHMORE.
INDUCTOR ALTERNATOR.
APPLICATION FILED OCT. 5, 1905.

2 SHEETS—SHEET 1.

Witnesses:
Murray D Badgley
Benjamin B Hull

Inventor:
David B. Rushmore
By Albert G. Davis
Att'y

No. 831,475. PATENTED SEPT. 18, 1906.
D. B. RUSHMORE.
INDUCTOR ALTERNATOR.
APPLICATION FILED OCT. 5, 1905.
2 SHEETS—SHEET 2.
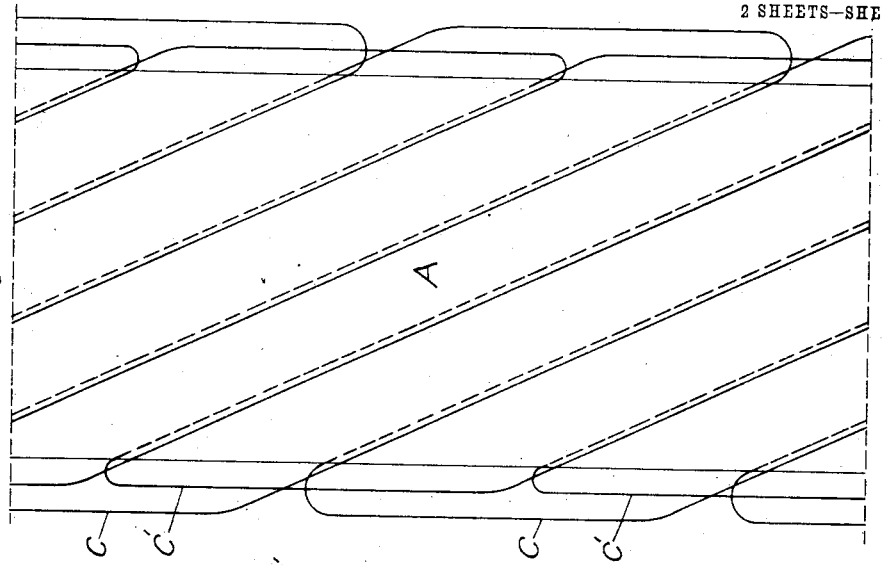
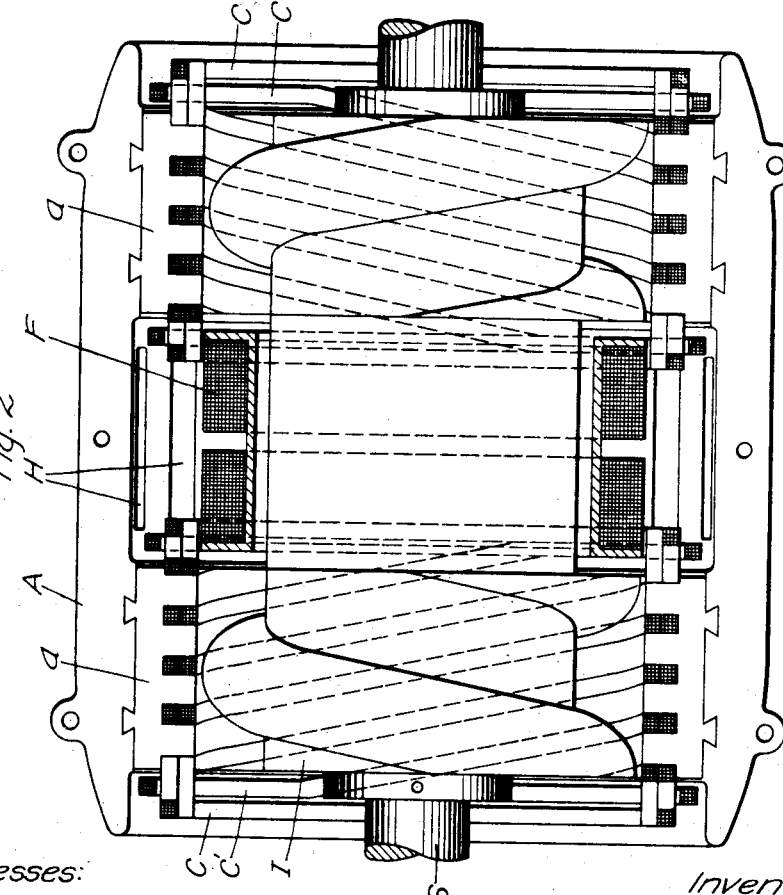
Witnesses:
Inventor:
David B. Rushmore
By Albert G. Davis
Atty.

UNITED STATES PATENT OFFICE.

DAVID B. RUSHMORE, OF SCHENECTADY, NEW YORK, ASSIGNOR TO GENERAL ELECTRIC COMPANY, A CORPORATION OF NEW YORK.

INDUCTOR-ALTERNATOR.

No. 831,475.　　　Specification of Letters Patent.　　　Patented Sept. 18, 1906.

Application filed October 5, 1905. Serial No. 281,408.

*To all whom it may concern:*

Be it known that I, DAVID B. RUSHMORE, a citizen of the United States, residing at Schenectady, in the county of Schenectady and State of New York, have invented certain new and useful Improvements in Inductor-Alternators, of which the following is a specification.

My invention relates to dynamo-electric machines, and particularly refers to inductor-alternators of the general type described in Patent No. 499,446, Stanley and Kelly, dated June 13, 1893. The type of alternator disclosed in this patent comprises a cylindrical revolving inductor with polar projections at both ends, an armature-body surrounding the inductor and carrying armature-coils in inductive relation to the polar projections, and a field-coil surrounding the inductor and supported at the central portion of the armature-body between the armature-coils. A machine of this type produces an alternating current in the armature-coils of a frequency equal to the number of poles at each end of the inductor multiplied by the number of revolutions per second. The minimum number of poles that can be used in a machine of this type as heretofore arranged while maintaining a mechanical balance is two at each end of the inductor. Such a machine would give two cycles per revolution. For low-frequency alternators driven by steam-turbines a speed would be required too low for efficient operation of the turbine—particularly in units of comparatively small output.

The object of my invention is to reorganize an alternator of the type above described so that the maximum speed for a given frequency may be doubled.

In an application Serial No. 268,316, filed July 6, 1905, by C. A. Kelsey, assignor to the Stanley Electric Manufacturing Company, of Pittsfield, Massachusetts, is described an inductor-alternator in which the inductor is provided with a helical polar projection, so that only one cycle per revolution is obtained, while the machine is nevertheless properly balanced.

My invention consists in rearranging an inductor-alternator of the type described in Patent No. 499,446, above referred to, so that the inductor may be provided with helical polar projections. In this way I obtain a machine having the desirable characteristics of the alternator described in that patent, while at the same time securing a machine which will produce only one cycle per revolution.

My invention will best be understood by reference to the accompanying drawings, in which—

Figure 1 shows an end elevation of an inductor-alternator arranged in accordance with my invention. Fig. 2 shows a side elevation of the same, one-half of the armature-body being removed; and Fig. 3 shows a diagrammatic development of one-half of the armature.

In the drawings, 1 represents the inductor, mounted on the revolving shaft S. The inductor is provided at each end with a helical projection, as is clearly shown in Fig. 2, and these projections are preferably oppositely arranged—that is, if one helix is considered as right-handed the other is left-handed. A represents the armature-body, which is provided at each end with laminations $a$, so as to form a laminated ring surrounding each polar projection of the inductor, the two rings being joined by a bridge of magnetic material. F represents the field coil or coils, which are supported by the armature-body beneath the magnetic bridge joining the two laminated rings. The armature-coils C C' are arranged in helical slots in the laminated rings of the armature-body. The magnetic bridge joining the laminated rings is provided with ventilating-holes H.

With this construction it is evident that the field-coils will magnetize the inductor, so that one helical projection will be of north polarity and the other of south polarity. A flux passes outwardly from one polar projection through the laminated ring surrounding it, across the magnetic bridge to the other laminated ring, and back to the other helical pole of the inductor. If the armature-coils are arranged in inductive relation to the polar projections, it is evident that as the inductor revolves alternating electromotive forces will be induced in the armature-coils, and since the projections are in the form of a helix the induced electromotive force in the armature-coils will pass through one cycle for each revolution of the inductor.

As has been pointed out heretofore, the helical polar projections are preferably oppositely arranged. The purpose of this is to allow them to act more efficiently as blowers, drawing air in from both ends of the machine. This air passes between the field and armature coils, cooling both of them, and escapes outwardly through the holes H in the central portion of the armature-body. Furthermore, since air is drawn in from both ends toward the center the inductor is balanced with respect to the axial wind-pressure, so that there is no end thrust due to the blower action. The machine is also balanced magnetically.

In the drawings the armature-coils are shown arranged for producing two-phase currents. The coils of one phase are indicated by C and those of the other phase, displaced ninety electrical degrees, by C'. The arrangement of the coils of the two phases in the helical slots of the armature is shown clearly in Fig. 3. In this figure, which is purely diagrammatic, each coil is represented by a single line. The top coils in each slot are indicated by full lines and the bottom coils by dotted lines. It will be seen that the end connections of each coil extend substantially one hundred and eighty degrees around the armature. This is also clearly shown in Fig. 1. The machine is not limited to the production of two-phase currents; but by properly arranging the coils currents of any number of phases may be secured, as will be obvious to those skilled in the art.

What I claim as new, and desire to secure by Letters Patent of the United States, is—

1. In a dynamo-electric machine, a revolving inductor having a helical polar projection at each end, a field-coil surrounding the inductor between said projections, and a stationary armature provided with coils in inductive relation to said projections.

2. In a dynamo-electric machine, a revolving inductor having a helical polar projection at each end, a field-coil surrounding the inductor between said projections, an armature-body surrounding said inductor, and helically-arranged coils carried in slots in said armature-body opposite said polar projections.

3. In a dynamo-electric machine, a revolving inductor having a helical polar projection at each end, an armature-body having a laminated ring surrounding each polar projection and a magnetic bridge joining said laminated rings, a field-coil surrounding the central portion of the inductor and supported by the armature-body beneath said magnetic bridge, and armature-coils arranged in helical slots in said laminated rings.

4. In a dynamo-electric machine, a revolving inductor having oppositely-arranged helical projections at its ends, a field-coil surrounding the inductor between said projections, an armature-body surrounding said inductor and provided with ventilating-holes near its central portion, and coils carried by said armature-body in inductive relation to said polar projections.

5. In a dynamo-electric machine, a revolving inductor having oppositely-arranged helical projections at its ends, an armature-body having a laminated ring surrounding each polar projection and a magnetic bridge joining said laminated rings and provided with ventilating-holes, a field-coil supported by the armature-body beneath said bridge, and armature-coils arranged in helical slots in said laminated rings.

In witness whereof I have hereunto set my hand this 4th day of October, 1905.

DAVID B. RUSHMORE.

Witnesses:
BENJAMIN B. HULL,
MARGARET E. WOOLLEY.